United States Patent
Bourgeois et al.

(10) Patent No.: US 7,989,118 B2
(45) Date of Patent: Aug. 2, 2011

(54) SYSTEM AND METHOD FOR MANUFACTURING FUEL CELL STACKS

(75) Inventors: Richard Scott Bourgeois, Albany, NY (US); Richard Louis Hart, Broadalbin, NY (US); Sauri Gudlavalleti, Hyderabad (IN); Shu Ching Quek, Clifton Park, NY (US); Andrew Philip Shapiro, Schenectady, NY (US); Rong Fan, Rancho Palos Verdes, CA (US); Dacong Weng, Rancho Palos Verdes, CA (US); Xiwang Qi, Torrance, CA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/791,266

(22) Filed: Jun. 1, 2010

(65) Prior Publication Data

US 2010/0239940 A1    Sep. 23, 2010

Related U.S. Application Data

(63) Continuation of application No. 11/101,697, filed on Apr. 7, 2005, now abandoned.

(51) Int. Cl.
*H01M 2/20* (2006.01)
*H01M 8/24* (2006.01)
*H01M 2/08* (2006.01)
*H01M 2/14* (2006.01)

(52) U.S. Cl. ........ 429/510; 429/468; 429/469; 429/508; 429/509

(58) Field of Classification Search ............... 429/468, 429/469, 508, 509, 510
See application file for complete search history.

(56) References Cited

U.S. PATENT DOCUMENTS

| | | | |
|---|---|---|---|
| 5,770,327 | A | 6/1998 | Barnett et al. |
| 5,922,486 | A | 7/1999 | Chiao |
| 6,051,173 | A | 4/2000 | Fasano et al. |
| 6,426,159 | B1 | 7/2002 | Kralick |
| 2002/0064703 | A1 | 5/2002 | Mizuno |
| 2002/0164514 | A1 | 11/2002 | Keley et al. |
| 2002/0182471 | A1 | 12/2002 | Kralick |
| 2003/0235744 | A1 | 12/2003 | Pflaesterer |
| 2003/0235745 | A1 | 12/2003 | Mook et al. |
| 2004/0180252 | A1 | 9/2004 | Wortman et al. |
| 2005/0037252 | A1 | 2/2005 | Pham |

FOREIGN PATENT DOCUMENTS

WO    03026049 A2    3/2003

OTHER PUBLICATIONS

Fuel Cell Handbook, U.S Department of Energy, Fifth Edition; Oct. 2000; p. 8-1.

*Primary Examiner* — Gregg Cantelmo
*Assistant Examiner* — Eugenia Wang
(74) *Attorney, Agent, or Firm* — Francis T. Coppa

(57) ABSTRACT

A method of manufacturing a fuel cell stack is provided. The method provides forming an inspectable preassembly of multiple fuel cell assemblies that may be termed a pseudostack. Each fuel cell in the pseudostack has permanent electrical interconnections and sealing connections on only one of the two electrodes, namely an anode layer or a cathode layer. For example, an anode interconnect may be firmly attached to the anode layer by means of a bonding agent and a sealing agent used to seal passages on the anode layer of the fuel cell. Alternatively, seals and permanent electrical connections may be made on the cathode layer of the fuel cell, and not on the anode layer.

14 Claims, 4 Drawing Sheets

SYSTEM AND METHOD FOR MANUFACTURING FUEL CELL STACKS

CROSS-REFERENCE

This application is a continuation of application Ser. No. 11/101,697, filed Apr. 7, 2005 and abandoned on Aug. 26, 2010, which is hereby incorporated by reference herein in its entirety.

BACKGROUND

The invention relates generally to a fuel cell stack and more particularly to a sealing process of the fuel cell stack.

Fuel cells produce electricity by oxidizing fuel on one electrode (anode) and reducing oxygen on the other electrode (cathode). The electrodes are separated by an electrolyte that conducts electricity by the migration of ions. Under the appropriate conditions the reduction/oxidation reactions on the electrodes produce a voltage, which can then be used to generate a flow of direct current. In the case of a solid oxide fuel cell operating with hydrogen fuel and air as an oxidant, oxygen ions are conducted through the electrolyte where they combine with hydrogen to form water as an exhaust product. The electrolyte is otherwise impermeable to both fuel and oxidant and merely conducts oxygen ions. This series of electrochemical reactions is the sole means of generating electric power within the fuel cell. It is therefore desirable to reduce or eliminate any mixing of the reactants that results in a different combination such as combustion which does not produce electric power and therefore reduces the efficiency of the fuel cell.

The fuel cells are typically assembled in electrical series in a fuel cell stack to produce power at useful voltages. To create a fuel cell stack, an interconnecting member, referred to as an interconnect, is used to connect the adjacent fuel cells together in electrical series to form a fuel cell assembly. Typically, an anode layer is connected to an anode interconnect and a cathode layer is connected to a cathode interconnect. When the fuel cells are operated at high temperatures, such as between approximately 600° C. and 1000° C., the fuel cells are subjected to mechanical and thermal loads that may create strain and resulting stress in the fuel cell stack.

Typically, high temperature fuel cells are made of ceramics, which must be sealed to the metallic interconnect structure in order to define closed passages for reactants, namely the fuel and the oxidant to flow to and from the fuel cell. During the thermal cycles of the fuel cell assembly, various components of the fuel cell stack expand and/or contract in different ways due to the difference in the coefficient of thermal expansion of the materials of construction. In addition, individual components may undergo expansion or contraction due to other phenomena, such as a change in the chemical state of one or more components. This difference in dimensional expansion and/or contraction may affect the seal separating the oxidant and the fuel paths and also the sealing of the elements made of dissimilar materials.

Conventionally, a typical anode layer of a fuel cell is made of a nickel based cermet, which itself is made by chemical reduction of nickel oxide in mixture with a ceramic. A major problem in fuel cell stack design is that the high temperature typically requires that the seals be made of brittle materials such as glass and glass ceramics. Prior to operation, the nickel oxide in the anode of the fuel cell is reduced to nickel at high temperature, and this chemical reduction causes a physical reduction of volume of the anode. This reduction in the volume of the anode layer can place additional stress on links between the fuel cell and other components, such as the seal, and can cause the seal of the fuel cell assembly or the fuel cell itself to fail. This is aggravated by the stresses arising from different coefficients of thermal expansion of the ceramic and metal, thereby causing the unequal physical reduction of volume of the anode layer and the interconnect in contact with the anode layer. Another consequence of the differential thermal and chemical expansions of the fuel cell and the interconnect is the potential loss of mechanical contact between the anode layer or cathode layer and its corresponding interconnect (the anode interconnect or the cathode interconnect).

In addition, conventional processing of multiple fuel cells in a fuel cell stack has relied upon sealing all or several of the fuel cells and interconnects in a single process to form an integral, inseparable stack. If, following such assembly and processing, a defect is identified in any seal of the fuel cell stack, the fuel cell stack cannot be disassembled without destroying the seals. This means that any defect in the fuel cell stack could render the entire fuel cell stack unusable.

A common approach to the thermal stress problem is to find a combination of ceramic and metal where the coefficients of thermal expansion match closely enough that stresses are minimized. However, it is very difficult to match the coefficients over the entire temperature range. Moreover, even such matching does not avoid stresses due to the reduction in volume of the anode layer in its pre-operation transition from a ceramic and nickel oxide mixture to a nickel based cermet. Also, the materials chosen based upon a close thermal match may not be optimal for the performance of the fuel cell.

Therefore, there is a need to design a fuel cell stack that is compliant to changes in operating states including temperature cycles and changes in chemical state, and that permits the seal of the individual fuel cells in a fuel cell stack to be inspected before the final assembly.

BRIEF DESCRIPTION

According to one aspect of the present technique, a method of manufacturing a fuel cell assembly is provided. The method provides forming an inspectable preassembly of multiple fuel cell assemblies that may be termed a pseudostack. Each fuel cell in the pseudostack has permanent electrical interconnections and sealing connections on only one of the two electrodes, namely an anode layer or a cathode layer. For example, an anode interconnect may be firmly attached to the anode layer by means of a bonding agent and a sealing agent used to seal passages on the anode layer of the fuel cell. Alternatively, seals and permanent electrical connections may be made on the cathode layer of the fuel cell, and not on the anode layer.

In another embodiment of the present technique, a method is provided that includes reducing the anode layer using a reducing gas prior to sealing the anode layer. Where a glass seal is used to seal the anode layer to the anode interconnect, the anode layer may be reduced prior to melting and making the seal, or during the sealing process. Where a fuel cell stack is formed, multiple anode layers may be reduced simultaneously, such as through the use of a reducing gas manifold. The construction of a pseudostack allows all of the anode layers to be reduced simultaneously and the sealing accomplished, while still permitting disassembly for testing and replacement of any defective fuel cells.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
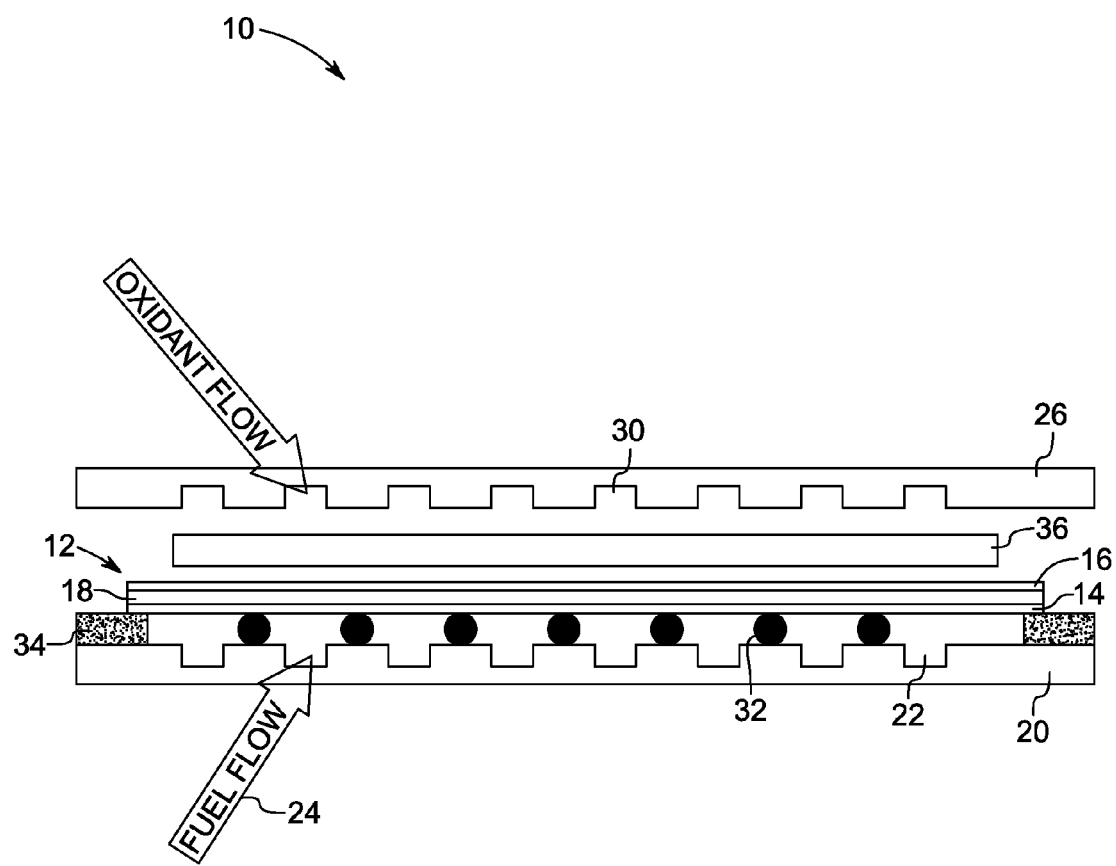
FIG. 1 is a diagrammatical illustration of an exemplary arrangement of functional components of a fuel cell assembly, in accordance with aspects of the present technique.

Turning now to the drawings and referring first to FIG. 1, an exemplary diagrammatical arrangement of functional components of a fuel cell assembly 10 is illustrated. The arrangement in FIG. 1 includes a fuel cell 12 having a first electrode 14, a second electrode 16 and an electrolyte 18 interposed between the first electrode 14 and the second electrode 16. The fuel cell assembly 10 also includes a first interconnect 20 having a plurality of flow channels 22. Similarly, the fuel cell assembly further includes a second interconnect 26 having a plurality of flow channels 30. In the exemplary fuel cell assembly 10, the first electrode is an anode layer 14 and the second electrode is a cathode layer 16. Accordingly the first interconnect 20 is an anode interconnect 20 and is configured to be bonded with the anode layer. Likewise, the second interconnect 26 is a cathode interconnect and is configured to be bonded with the cathode layer.

In another embodiment, in a reverse configuration, the first electrode is the cathode layer 16 and the second electrode is the anode layer 14. Accordingly in this embodiment, the first interconnect is a cathode interconnect 26 and the second interconnect is the anode interconnect 20. It may be noted that all the description of the individual elements in the following sections will be applicable for both the embodiments described above.

The anode interconnect 20 having multiple flow channels 22 is configured to introduce a reducing gas 24 (also referred as a fuel gas) to the anode layer 14. Likewise, the cathode interconnect 26 having multiple flow channels 30 is configured to introduce an oxidant to the cathode layer 16. As described below, multiple such fuel cells may be included in the assembly to form a fuel cell stack. Moreover, the fuel cell stack may be formed as a pseudostack by making only some of the interconnections and seals to be included in the final assembly. This may be referred to as the presealing process. This process of presealing may permit disassembly of the fuel cells from one another for testing, and replacement of any defective fuel cells prior to final assembly, interconnection and sealing.

In the exemplary embodiment as shown in FIG. 1, a bonding agent 32 provides a conducting medium between the anode layer 14 and the anode interconnect 20. Typically, the anode interconnect 20 is sealed to the anode layer 14 around the perimeter of the anode layer using a suitable sealing agent 34. In a present implementation, the sealing agent 34 is glass that is fused between the anode layer and the anode interconnect, such as during formation of a pseudostack, as described below. Because the bonding agent is typically porous and conductive, the sealing agent 34 seals the anode layer 14 to the anode interconnect 20 and also seals the edge around the bonding agent 32. The method for the manufacturing of the pseudostack and the defect free fuel cell stack will be explained in further sections below. Suitable materials for use as the bonding agent include nickel oxide paste, nickel paste, and platinum paste. Suitable materials for use as sealing agent include glass, glass-ceramics, nickel oxide and nickel pastes. Other materials that provide similar functionality may, of course, be used.

The exemplary arrangement as shown in FIG. 1 also includes a cushion layer 36 disposed in between the cathode layer 16 and the cathode interconnect 26. The cushion layer 36 is a compliant material that is included in the pseudostack to allow mechanical force to be transmitted axially to the bonding agent as well as the perimeter of the sealing agent through the fuel cell stack during the presealing process. The cushion layer 36 does not necessarily conduct electric current between the cathode layer 16 and the cathode interconnect 26. Some of the functions of the interconnects (anode interconnect 20 and the cathode interconnect 26) in fuel cell assembly 10 are to provide electrical contact between the fuel cells 12 connected in series or parallel, to provide the reducing gas 24, such as hydrogen, to similarly provide oxidant flow passages, and to provide structural support.

Figure 2:
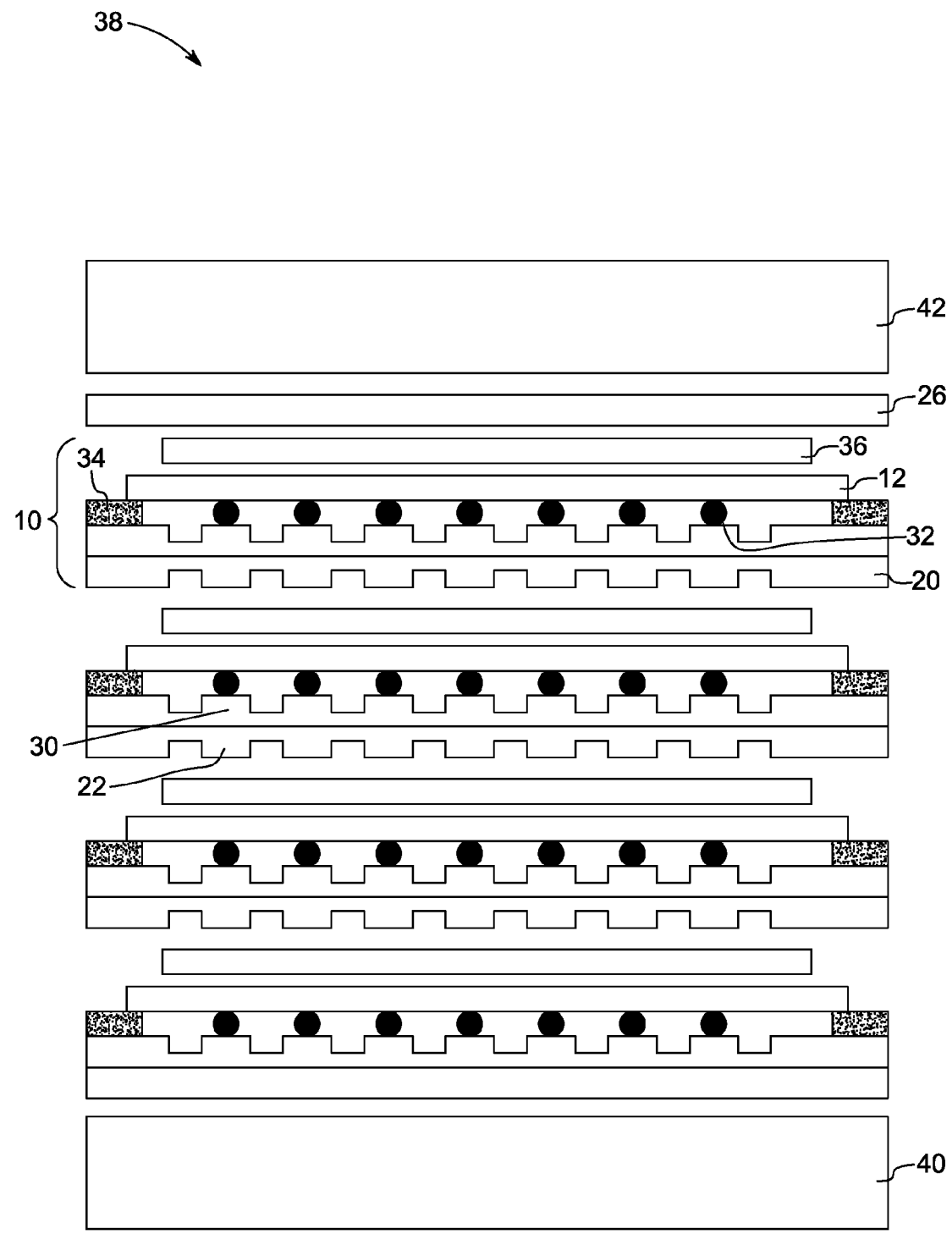
FIG. 2 is a diagrammatical illustration of an exemplary arrangement of functional components of a fuel cell pseudostack comprising multiple fuel cell assemblies, illustrated in FIG. 1, in accordance with aspects of the present technique.

Turning now to FIG. 2, an exemplary arrangement of functional components of a fuel cell pseudo stack 38 is illustrated. The fuel cell stack 38 includes multiple fuel cell assemblies 10 of the type discussed above with reference to FIG. 1. In the exemplary embodiment of FIG. 2, flow channels of the anode interconnect 20 and the cathode interconnect 26 are fabricated from an electrically conductive material capable of operating at the elevated temperatures experienced by the cells during operation. As described above with respect to FIG. 1, each fuel cell 12 comprises an anode layer 14, a cathode layer 16 and an electrolyte 18 disposed therebetween. Each fuel cell assembly 10 is disposed in such a way that the cathode layer 16 is directly exposed to the flow channels 30 for flow of oxidant to the cathode layer 16, and anode layer 14 is directly exposed to the reducing gas 24 flowing in the flow channels 22.

The fuel cell stack 38 also includes a base plate 40 during processing. Also during processing, a weight 42 may be placed on top of the fuel cell stack 38 to provide a compressive force to the fuel cell stack 38 for sealing. After the fuel cell stack 38 is formed, the base plate 40 and the weight 42 are dismantled from the fuel cell stack 38. The compressive force for sealing and bonding may, of course, be applied through other means such as bolts, hydraulic or pneumatic actuators, and so forth.

As mentioned above, and as discussed in greater detail below, the present technique facilitates significantly improved productivity, processing and reliability in the formation of the fuel cell stack by permitting disassembly and inspection of the individual fuel cells. In particular, in one implementation, the anode layer is sealed to the anode interconnect, with the bonding agent in place, but with no permanent connection on the cathode side during initial assembly into the pseudostack. The fuel cells may then be disassembled for testing. Defective or poorly performing fuel cells may be discarded or reworked, with final assembly being made only with known good fuel cells. Alternatively, the interconnections for pseudostack may be initially made only on the cathode side of each fuel cells, followed by sealing and/or bonding of the anode layer in the final assembly process.

During operation of fuel cell assembly 10, oxygen ions ($O^{2-}$) generated at the cathode layer 16 are transported across the electrolyte 18 interposed between the anode layer 14 and the cathode layer 16. The reducing gas 24, for example hydrogen, is fed to the anode layer 14. The reducing gas 24 at the anode layer 14 reacts with oxygen ions ($O^{2-}$) transported to the anode layer 14 across the electrolyte 18. The oxygen ions (O2-) combine with hydrogen to form water and release electrons into an external electric circuit (not shown). The reaction rate of hydrogen with oxygen ions is therefore directly proportional to the current. In the case of an open circuit (no current) there is no reaction and the voltage across the electrodes remains at a maximum level.

The main purpose of the anode layer 14 is to provide reaction sites for an electrochemical oxidation of the reducing gas 24 introduced into the fuel cell 12. In addition, the anode layer 14 material should be stable in the reducing gas 24 reducing environment, have adequate electronic conductivity, surface area and catalytic activity for the reducing gas reaction at the fuel cell operating conditions and have sufficient porosity to allow fuel gas transport to the reaction sites. The reducing gas is generally introduced through a gas manifold. The anode layer 14 can be made of a number of materials having these properties, including, noble metals, transition metals, cermets, ceramics and combinations thereof. More specifically the anode layer 14 may be made of any suitable material, such as Nickel (Ni), Ni Alloy, Ag, Cu, Cobalt, Ruthenium, Ni—YSZ cermet, Cu—YSZ cermet, Ni-Ceria cermet, or combinations thereof.

The preparation of certain anode materials involves chemical reduction. For example, the fuel cell may be constructed with the anode layer containing nickel oxide, which is stable in air. Prior to operation of the fuel cell stack, the nickel oxide must be reduced to nickel. The anode layer may undergo dimensional changes as well as changes in thermal expansion properties during the reduction process. If the fuel cell is sealed to the anode interconnect or the cathode interconnect during the reduction process, these dimensional changes in the constrained fuel cell may cause failure of the fuel cell or the sealing. Therefore, the present technique also improves reliability of the individual fuel cells, and thereby of fuel cell assemblies and fuel cell stacks, by reducing the anode layer either prior to formation of the seal between the anode layer and the anode interconnect, or during the sealing process. As discussed below, multiple anode layers may be reduced simultaneously, as in the pseudostack. As also discussed below, gases used to reduce the anode layer may include hydrogen, or any other suitable gas capable of producing the desired reduction reaction.

The cathode layer 16 is disposed over the electrolyte 18. The main purpose of the cathode layer 16 is to provide reaction sites for the electrochemical reduction of oxygen to generate oxygen ions that carry current through the electrolyte. Accordingly, the cathode layer 16 is stable in the oxidizing environment, has sufficient electronic and ionic conductivity, surface area and catalytic activity for the oxidant reaction at the fuel cell 12 operating conditions and has sufficient porosity to allow gas transport to the reaction sites. The cathode layer 16 can be made of a number of materials having these properties, including an electrically conductive oxide, perovskite, doped LaMnO3, tin doped Indium Oxide (In2O3), Strontium-doped PrMnO3, La ferrites, La cobaltites, RuO2-YSZ, and combinations thereof.

The anode interconnect 20 may be made of any suitable material, such as electrically and conductive materials, including stainless steel, nickel, nickel alloys, fecralloy, nichrome, gold, silver, platinum, palladium, ruthenium, or rhodium or combinations thereof. Similarly, the cathode interconnect 26 may be made of an electrically and conductive material, such as stainless steel, fecralloy, nichrome, gold, silver, platinum, palladium, ruthenium, or rhodium or combinations thereof.

In some embodiments, the anode interconnect 20 and the cathode interconnect 26 may be combined to act as a bipolar element, where the cathode layer side of the bipolar element, having the cathode layer side adjacent to the cathode layer 16 of one of the fuel cell assembly 10, acts as a cathode interconnect 26. The anode layer side of the bipolar element, where anode layer side is adjacent to the anode layer 14 of the next fuel cell assembly 10, acts as an anode interconnect 20. Moreover, the bipolar element further acts as the passage for the oxidant for the cathode layer 16 and the passage for the reducing gas 24 for the anode layer 14 in the fuel cell assembly 10.

Advantageously, due to the partial assembly of each of the fuel cell assemblies 10 into a disassemblable pseudostack, a number of non-destructive tests and inspections are made possible on the fuel cells before the fuel cell assembly is finally assembled. In an exemplary embodiment of the present technique, the testing and inspection includes performing a leak test, a resistance measurement test, an impedance measurement test, a mechanical integrity test, an ultrasound test, a X-ray test, measurement of open circuit voltage, an impedance spectroscopy or an electrochemical performance test. However, in production, some or all of these tests may be performed, and these may be supplemented by other tests and inspections, where desired.

Furthermore, in one embodiment, the pseudostack may be tested and inspected using one or more of the testing methods specified above to determine faulty or defective fuel cell assemblies. Upon identification of the defective fuel cell assemblies, the fuel cell stack may be formed using multiple defect free fuel cell assemblies. In certain other implementations, when individual fuel cell assemblies are formed, they may be individually tested and inspected for defects prior to assembly to form the fuel cell stack. However, as will be appreciated by those skilled in the art, one advantage of forming the pseudostack prior to testing and inspecting allows the use of a single manifold for providing the reducing gas to the plurality of the anode layers in the pseudostack. These embodiments, as discussed herein should be appropriately borne in mind for the discussions herein below.

As explained above, in accordance with embodiments of the present technique as illustrated in FIG. 2, the presealing process of either the anode layer or the cathode layer is performed during creation of the pseudostack. For example, in a presently contemplated embodiment, the anode layer 14 is secured to the anode interconnect 20 via the bonding agent and the sealing agent (glass) between the anode layer and the anode interconnect, and at the border of the anode layer around the edge of the bonding agent. However, as discussed above, it should be noted that in another embodiment of the present technique, the presealing process could be carried out on the cathode side in the fuel cell stack 38, after temporarily assembling each of the fuel cell assemblies 10 to form the pseudostack. As discussed above, if for example the cathode layer 16 does not cover the entire surface of the fuel cell 12, the electrolyte 18 is exposed and the cathode layer side seal may be made between the cathode interconnect 30 and the electrolyte 18.

Figure 3:
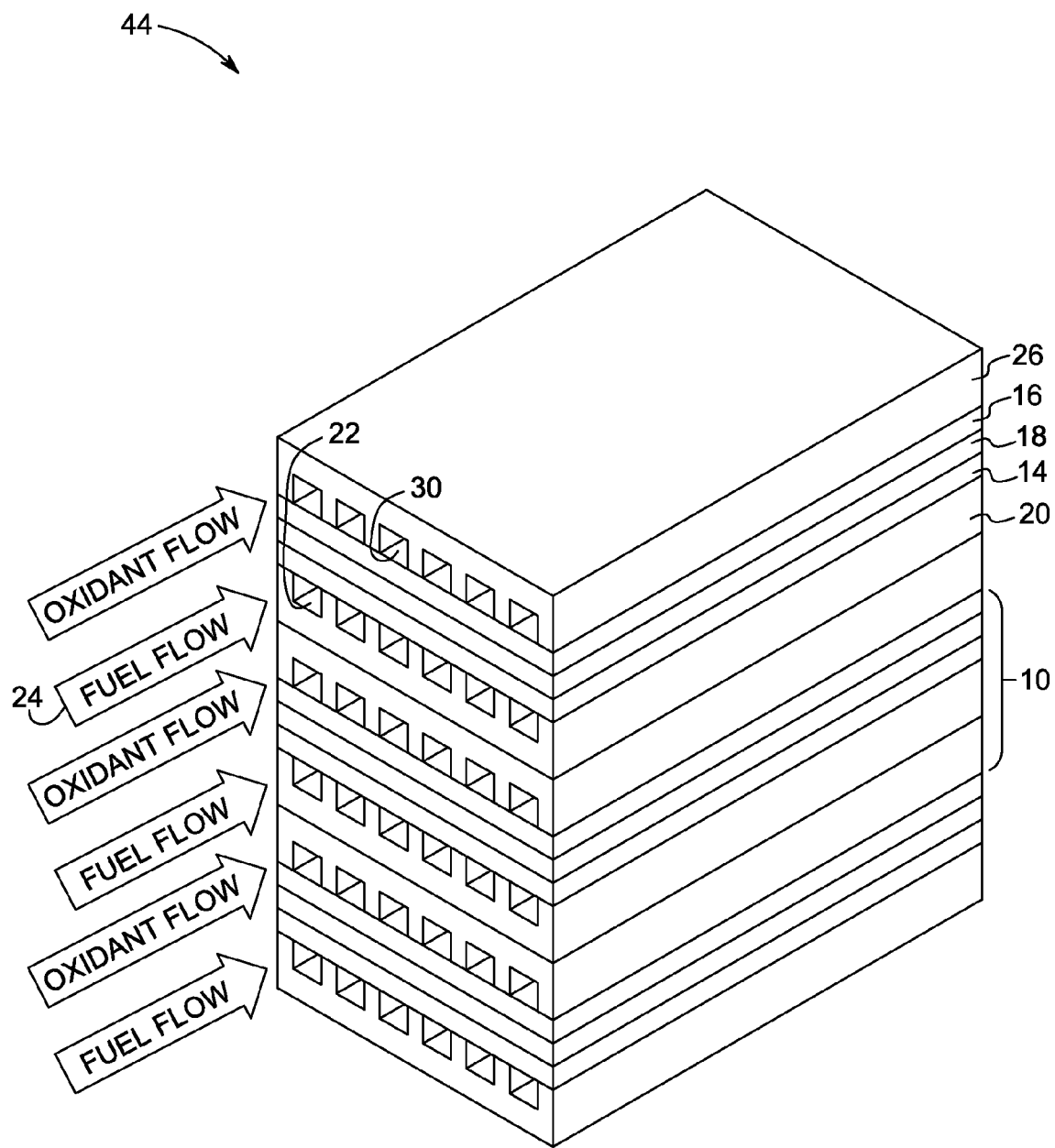
FIG. 3 is a diagrammatical illustration of an exemplary assembled fuel cell stack, in accordance with aspects of the present technique.

Turning now to FIG. 3, an exemplary assembled fuel cell stack 44 is illustrated. As explained in earlier sections above, after the non-destructive test and inspection is carried out for the individual fuel cell assemblies 10, multiple fuel cell assemblies 10 are stacked together to form the assembled fuel cell stack 44. In certain embodiments of the present technique, the cushion layer 36 is removed after the disassembly of the pseudostack and prior to the formation of the fuel cell stack 44 as illustrated in FIG. 2. During the formation of the assembled fuel cell stack 44, the electrode (either the anode layer to the cathode layer) that was not firmly connected to its corresponding interconnect (the anode interconnect or the cathode interconnect) during the assembly of the pseudostack is connected using the bonding agent. For example, the cathode layer 16 is bonded to the cathode interconnect 30 using the cathode bonding agent such as lanthanum, strontium, manganate paste, doped lanthanum ferrite paste, doped lanthanum cobaltite paste or other electronic conductive pastes suitable to high temperature oxidizing environments. During operation of fuel cell stack 44, the anode layer 14 in each of the fuel cell assemblies does not undergo further chemical reduction.

Figure 4:
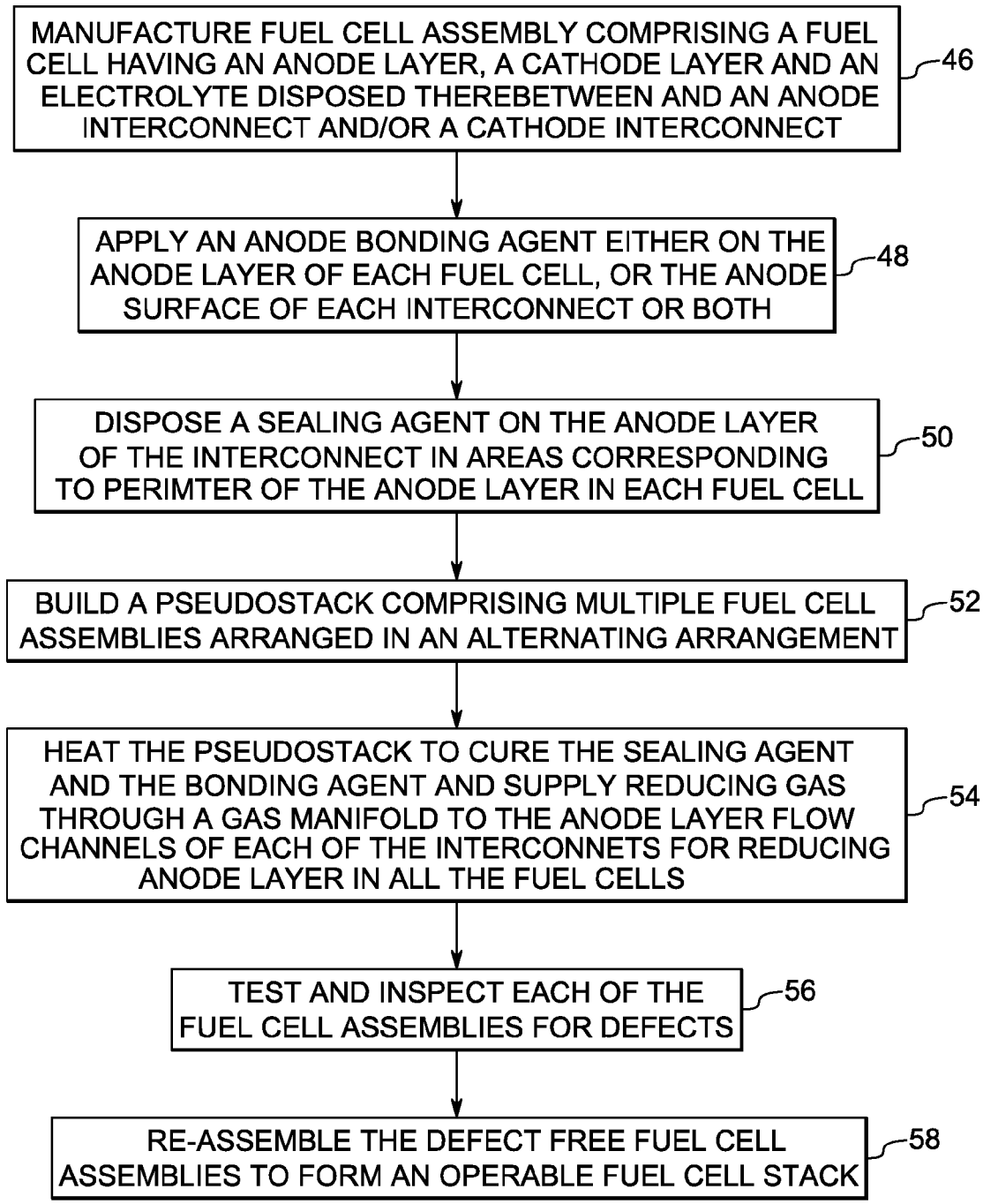
FIG. 4 is a flow diagram illustrating an exemplary method of manufacturing the fuel cell stack of FIG. 2, in accordance with aspects of the present technique.

Referring to FIG. 4, a flow diagram is illustrated for an exemplary method of manufacturing the fuel cell stack of FIG. 2. The method involves manufacturing the fuel cell assembly comprising the fuel cell, which includes the anode layer, the cathode layer and the electrolyte disposed therebetween and the anode interconnect and/or the cathode interconnect as indicated by step 46. The method also involves bonding the anode layer to the anode interconnect using the bonding agent on either the anode layer or the anode side of the anode interconnect (block 48). At step 50, the sealing agent is used to seal the anode layer with the anode interconnect. In one embodiment, as indicated in step 50, the perimeter of the anode layer may be sealed to the anode interconnect using the glass sealing agent while the reducing gas is introduced into the anode layer. In another implementation of the present technique, the sealing agent is used to seal at least one cathode interconnect with the cathode layer of each fuel cell. At step 52, the pseudostack is manufactured using multiple fuel cell assemblies arranged in an alternating arrangement. As explained in earlier sections, a fuel cell assembly comprises one fuel cell and the anode interconnect and/or the cathode interconnect.

It should be noted that the cushion layer is placed on the cathode layer surface of each fuel cell prior to placing the next interconnect (anode interconnect or cathode interconnect) over it. As noted above, processing multiple cells in a pseudostack will permit disassembly of the cells from one another for testing and elimination of defective fuel cells. In the pseudostack, only one electrode (anode layer or cathode layer) of each fuel cell is sealed. In the present contemplated embodiment, the anode layer is left unsealed, which is to be ultimately sealed only upon final assembly to form the fuel cell stack. Sealing is performed around the cathode layer to the cathode interconnect. Alternatively, the anode layer may be sealed in the pseudostack, and the cathode layer left unsealed.

The method further comprises heating the pseudostack for curing the sealing agent and the bonding agent as indicated in step 54. It should be noted that the sealing is performed by heating the pseudostack at a temperature approximately about 900 degrees Celsius for duration of approximately about 60 minutes to fuse the sealing agent (glass). The time and temperature will be dependent on the sealing agent used. Furthermore, at step 54, a reducing gas is supplied through a gas manifold to the flow channels of the anode layer in all the fuel cell assemblies for reducing the anode layer. The circulation of the reducing gas (e.g., hydrogen) and the heating of the pseudostack may occur simultaneously. The reducing gas causes the anode layer to undergo a reduction reaction between the reducing gas and the anode layer. As noted above, the reduction reaction may reduce the volume of the anode layer, as well as change certain properties, such as the coefficient of thermal expansion. Moreover, the reduction of the anode layer may be done at the time of fusion of the sealing agent, or prior to sealing of the anode layer with the anode interconnect. Where the anode layer is reduced in a pseudostack, the inlet manifold for the entire pseudostack may assist in the process by permitting the reducing gas to be introduced into all of the fuel cells in the pseudostack to reduce all the anode layers at one time.

As indicated in step 56, the individual fuel cell assemblies in the pseudostack may be tested and inspected for defects. At step 58, the defect free fuel cell assemblies are selected from the individual fuel cell assemblies to form an operable fuel cell stack. The final assembly process includes completing any interconnects and seal that were not made in formation of the pseudostack.

In an alternative implementation, as mentioned above, the reducing gas may be introduced into the anode layer prior to sealing of the anode layer to the anode interconnect using the sealing agent. The reducing gas, again, results in reduction of the anode layer. At a later stage, then, the anode layer may be sealed to the anode interconnect. The pseudostack, thus formed, may then be tested and defective cells removed, and the stack reassembled and finally sealed in a similar manner as previously described to obtain the defect free fuel cell stack.

In certain other exemplary implementations, the defect free fuel cell stack may be obtained without the formation of the pseudostack. In the present implementation, the fuel cell assembly is formed as explained previously. However, each fuel cell assembly may be reduced by the passage of the reducing gas to form the reduced fuel cell assembly for testing and inspection. Two or more of the defect free reduced fuel cell assemblies may be stacked to form the defect free fuel cell stack.

As will be appreciated by those skilled in the art, the overall system offered by the present technique enables a variety of benefits over conventional fuel cells and their fabrication methods. In the present implementation, the anode layer 14 of the fuel cell assemblies 10 is reduced in volume prior to the final assembly and operation of the fuel cell 12 and concurrently with the hardening of sealing agent 34. This prevents damage of the fuel cell 12 or the sealing agent 34 due to the reduction in volume of the anode layer 14 while the fuel cell 12 is mechanically constrained by the hardened seal 34. In addition, the present technique also helps to perform certain tests and inspection of the fuel cell assemblies 10 before the final assembly of the fuel cell stack 38. The present process helps in eliminating the defective fuel cell assemblies 10 before the final assembly of the fuel cell stack, instead of eliminating the complete fuel cell stack in the event any fuel cell assembly is found to be defective.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method of manufacturing a fuel cell stack, comprising the steps of:
(i) forming a pseudostack, comprising the following steps:
(a) assembling multiple fuel cell assemblies, wherein each fuel cell assembly comprises a first electrode, an electrolyte, a second electrode, a first interconnect, and a second interconnect;

(b) applying a sealing agent between a perimeter of the first electrode and the first interconnect, or between the second electrode and the second interconnect of each fuel cell assembly;

(c) applying a bonding agent between either the first electrode and the first interconnect, or between the second electrode and the second interconnect of each fuel cell assembly; wherein the bonding agent is applied between the electrode and the interconnect to which the sealing agent was applied;

(d) heating the pseudostack for curing the sealing agent and the bonding agent, so as to permanently bond the first electrode and the first interconnect, or to permanently bond the second electrode and the second interconnect of each fuel cell assembly; while the electrode and interconnect which did not receive the applied sealing agent and bonding agent remain unsealed; and (e) connecting the unsealed electrode to the respective interconnect, without the sealing or bonding agent;

(ii) testing and inspecting the pseudostack for defective fuel cell assemblies and operative, defect-free fuel cell assemblies within the multiple fuel cell assemblies, (iii) disassembling the pseudostack and removing the defective fuel cell assemblies from the pseudostack; and (iv) finally forming the fuel cell stack by reassembling the operative, defect-free fuel cell assemblies, and permanently sealing the fuel cell stack.

2. The method of claim 1, wherein step (i) further comprises introducing a reducing gas through a gas manifold to the first electrode of each of the fuel cell assemblies before heating step (d), so as to chemically reduce a composition of the first electrode.

3. The method of claim 2, wherein reducing the composition of the first electrode via the reducing gas occurs prior to bonding the first electrode to the first interconnect or the second electrode with the second interconnect.

4. The method of claim 2, wherein the steps of reducing the first electrode via the reducing gas and bonding the first electrode to the first interconnect, or the second electrode to the second interconnect, occur simultaneously.

5. The method of claim 2, wherein the reducing gas comprises hydrogen.

6. The method of claim 2, wherein the first interconnect includes channels to supply the reducing gas to the first electrode.

7. The method of claim 2, wherein the first electrode comprises nickel.

8. The method of claim 7, wherein substantially all of the nickel of the first electrode is formed by the reduction of nickel oxide with the reducing gas.

9. The method of claim 1, wherein the first interconnect comprises an electrically conductive material selected from the group consisting of stainless steel, nickel, nickel alloys, gold, silver, platinum, palladium, ruthenium, rhodium, electronically conductive ceramic material, and combinations thereof.

10. The method of claim 1, wherein the second interconnect comprises an electrically conductive material selected from the group consisting of stainless steel, gold, silver, platinum, palladium, ruthenium, or rhodium, electronically conductive ceramic materials, and combinations thereof.

11. The method of claim 1, wherein the second interconnect is configured to have channels to supply an oxidant gas to the second electrode.

12. The method of claim 1, wherein the first interconnect and the adjacent interconnect are combined to act as a bipolar element.

13. The method of claim 1, wherein the first electrode comprises nickel, nickel alloy, silver, copper, cobalt, ruthenium, Ni—YSZ cermet, Cu—YSZ cermet, nickel-ceria cermet, or combinations thereof.

14. The method of claim 1, wherein step (ii) comprises performing at least one test selected from the group consisting of a leak test, a resistance measurement test, an impedance measurement test, a mechanical integrity test, an ultrasound test, an X-ray test, an infrared imaging measurement, a measurement of open circuit voltage, an impedance spectroscopy analysis, and an electrochemical performance test.

* * * * *